(12) United States Patent
Acacio

(10) Patent No.: US 8,881,139 B1
(45) Date of Patent: Nov. 4, 2014

(54) LEGACY APPLICATION REHOSTING SYSTEM

(71) Applicant: Ronald B. Acacio, Fallbrook, CA (US)

(72) Inventor: Ronald B. Acacio, Fallbrook, CA (US)

(73) Assignee: Infinite Corporation, Laguna Niguel, CA (US)

( * ) Notice: Subject to any disclaimer, the term of this patent is extended or adjusted under 35 U.S.C. 154(b) by 59 days.

(21) Appl. No.: 13/661,008

(22) Filed: Oct. 25, 2012

Related U.S. Application Data (60) Provisional application No. 61/550,953, filed on Oct. 25, 2011.

(51) Int. Cl.
G06F 9/445 (2006.01)
G06F 9/45 (2006.01)
G06F 9/44 (2006.01)

(52) U.S. Cl.
CPC ...... *G06F 8/76* (2013.01); *G06F 8/41* (2013.01)
USPC .......................................... 717/177; 717/140

(58) Field of Classification Search
USPC .......................................................... 717/177
See application file for complete search history.

(56) References Cited

U.S. PATENT DOCUMENTS

| | | | |
|---|---|---|---|
| 7,085,754 B2 * | 8/2006 | Sinnott, Jr. ............................. | 1/1 |
| 7,117,486 B2 * | 10/2006 | Wong et al. .................... | 717/141 |
| 2011/0107327 A1 * | 5/2011 | Barkie et al. .................. | 717/176 |

OTHER PUBLICATIONS

Oracle (Web article: Oracle Tuxedo Application Rehosting Workbench, copyright 2010, retrieved on Jan. 7, 2014; URL:http://www.oracle.com/technetwork/middleware/tuxedo/overview/art-workbench-datasheet-132949.pdf).*

Oracle Tuxedo, Webpage, www.oracle.com/technetwork/middleware/tuxedo/overview/oracle-tuxedo-12c-datasheet-1721265.pdf?ssSourceSiteld=ocomen, Downloaded & Printed Oct. 25, 2012.

Modernize IT Infrastructure, www.oracle.com/technetwork/middleware/tuxedo/overview/mf-rehost-solution-art-brief-1722399.pdf?ssSourceSiteld=ocomen, Downloaded&Printed Oct. 25, 2012.

* cited by examiner

*Primary Examiner* — Li B Zhen
*Assistant Examiner* — Hang Pan
(74) *Attorney, Agent, or Firm* — Michael S. Neustel (57) ABSTRACT

A legacy application rehosting system for operating a legacy operating system application on modern operating systems without substantially rewriting the legacy operating system application. The legacy application rehosting system generally includes transferring the source code from the legacy platform to the new platform, transferring the data from the legacy platform to an internal database of the legacy application on the new platform, execution of the legacy application on the new platform and remediating exceptions, migrating data from the internal database to a new database and deploying the system.

19 Claims, 9 Drawing Sheets

Overall Process

Phase 3 - Execute Application By Customer

FIG. 7

Phase 4 - Migrate Data to New Database

FIG. 8

Phase 5 - Deploy on New Platform

FIG. 9

LEGACY APPLICATION REHOSTING SYSTEM

CROSS REFERENCE TO RELATED APPLICATIONS

I hereby claim benefit under Title 35, United States Code, Section 119(e) of United States provisional patent application Ser. No. 61/550,953 filed Oct. 25, 2011. The 61/550,953 application is abandoned. The 61/550,953 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to legacy application modernization systems and more specifically it relates to a legacy application rehosting system for operating a legacy operating system application on modern operating systems without substantially rewriting the legacy operating system application.

2. Description of the Related Art

Any discussion of the related art throughout the specification should in no way be considered as an admission that such related art is widely known or forms part of common general knowledge in the field.

Businesses today are still using old computing platforms to run software applications that are important to their business. For example, the IBM® AS/400 is a computer system developed in 1988 as a midrange computer for general business use. The acronym "AS" stands for "Application System". The IBM® AS/400 utilizes the OS/400 operating system to form the computing platform that runs various software applications. The AS/400 is "object-based" where everything is an object versus object-orientated where everything is a file.

There is a need to utilize legacy applications developed for old computing platforms (e.g. the IBM® AS/400® platform) to modern computing platforms (e.g. UNIX®, LINUX®, WINDOWS®) and data migrated to newer databases (e.g. ORACLE®, MS SQL®). Legacy modernization (a.k.a. software modernization) involves the conversion, rewriting or porting of a legacy system to a modern computer platform which is very costly and time consuming. The following options are currently available for legacy modernization. "Migration" involves utilizing automated parsers and converters to migrate from one operating system to another operating system. "Re-engineering" involves rebuilding legacy operating system applications on a new computing platform usually by adopting service orientated architecture (SOA). "Rehosting" involves running the legacy operating system applications on a new computing platform with no major changes using middleware such as rehosting mainframe applications on a UNIX® or WINTEL computing platform. An example of a commercial rehosting product currently available is TUXEDO® produced by Oracle International Corporation since 1988.

Because of the inherent problems with the related art, there is a need for a new and improved legacy application rehosting system for operating a legacy operating system application on modern operating systems without substantially rewriting the legacy operating system application.

BRIEF SUMMARY OF THE INVENTION

The invention generally relates to a legacy application modernization system which includes transferring the source code from the legacy platform to the new platform, transferring the data from the legacy platform to an internal database of the legacy application on the new platform, execution of the legacy application on the new platform and remediating exceptions, migrating data from the internal database to a new database and deploying the system.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a communications network, such as the Internet.

FIGS. 1 through 9 illustrate the present invention. The legacy application 23 rehosting system generally includes transferring the source code from the legacy platform 20 to the new platform 30, transferring the data from the legacy platform 20 to an internal database of the legacy application 23 on the new platform 30, execution of the legacy application 23 on the new platform 30 and remediating exceptions, migrating data from the internal database to a new database 37 and deploying the system.

A. Legacy Platform.

Figure 1:
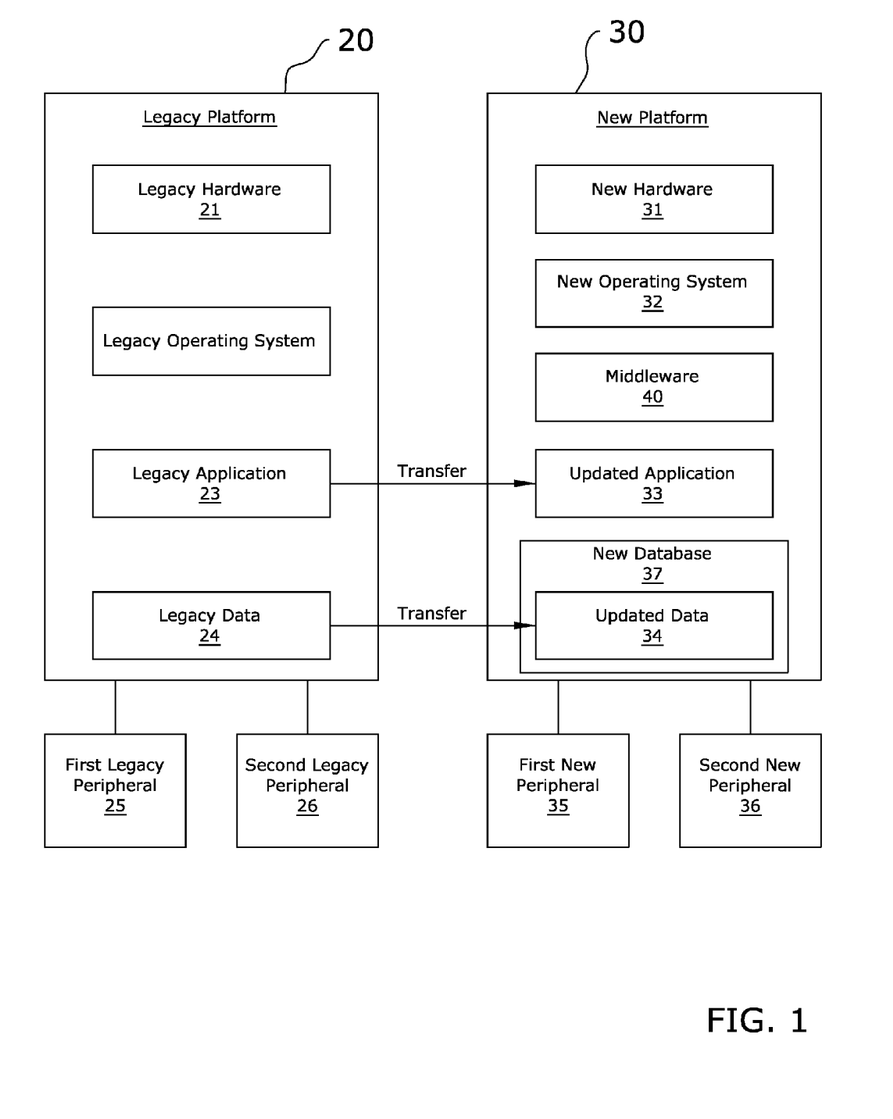
FIG. 1 is a block diagram illustrating the transfer of legacy application and legacy data from the legacy platform to the new platform.

The legacy platform 20 is a computing platform comprised of legacy hardware 21 and a legacy operating system 22 (a.k.a. an operating system) that together allow a legacy application 23 to run. The legacy hardware 21 may be comprised of any older computing platform that a business desires to retire and upgrade to a new platform 30.

The legacy hardware 21 may be comprised of various older computer systems. A preferred legacy platform 20 suitable for use with the present invention is the IBM® AS/400® which is a midrange business computer produced by International Business Machines Corporation starting in 1988. The legacy operating system 22 may be comprised of various operating systems that operate on the legacy hardware 21 such as but not limited to the IBM® OS/400® produced by International Business Machines Corporation which operates on the AS/400® computer. The IBM® AS/400® utilizes the DB2/400 database which operates at the machine level to store data for legacy applications 23 on the legacy platform 20. The DB2/400 database is a relational model database server developed by International Business Machines (IBM®). The present invention may be utilized with other computing platforms in addition to the IBM® AS/400®.

Various legacy peripheral devices 25, 26 may be in communication with the legacy platform 20 such as but not limited to printers, external memory, external hard drive monitors, touchscreen, barcode reader, graphic tablet, computers, computer terminal, computer mouse, keyboard, scanners, fax machines, tape drives, speakers, webcams and the like. The legacy peripheral devices 25, 26 may be comprised of input, output and/or storage devices.

B. Legacy Application and Data.

The legacy application 23 is any software application that operates on the legacy platform 20. The legacy application 23 may be comprised of various types of software including but not limited to accounting software, business management software, project management software and the like. Legacy applications programmed for the IBM® AS/400® are typically programmed in legacy code such as COBOL, RPG, CL, assembly language, C, C++, Pascal, Java, EGL, Perl, Smalltalk, SQL, SQLRPG, SQLCOBOL, ILERPG, BASIC, PHP, PL/I, Python and REXX.

C. New Platform.

The new platform 30 is a computing platform comprised of new hardware 31 and a new operating system 32 (a.k.a. an operating system) that together allow a legacy application 23 to run. The new hardware 31 may be comprised of any computing platform that a business is capable of using to run business software applications.

The new platform 30 may be comprised of any computer platform such as a server computer, cloud based computer, or other computer system capable of receiving and transmitting data via IP networks and telecommunication networks. The new platform 30 can be an IBM® based computer, or compatible thereof. The new platform 30 preferably includes various components commonly found in conventional computers such as a display screen (or monitor), a hard disk drive, a network interface, a keyboard, a microprocessor, a memory bus, random access memory (RAM), read only memory (ROM), a peripheral bus, and a keyboard controller.

The new platform 30 also includes a new operating system 32 that is significantly newer than the legacy operating system 22 used on the legacy platform 20. The new operating system 32 is capable of providing common services for software applications. The new operating system 32 may be comprised of various modern operating systems such as UNIX®, LINUX® or MICROSOFT WINDOWS®. The new operating system 32 may be installed on the new platform 30 prior to or after delivery of the new platform 30 to the customer.

Various new peripheral devices 35, 36 may be in communication with the new platform 30 such as but not limited to printers, external memory, external hard drive monitors, touchscreen, barcode reader, graphic tablet, computers, computer terminal, computer mouse, keyboard, scanners, fax machines, tape drives, speakers, webcams and the like. The new peripheral devices 35, 36 may be comprised of input, output and/or storage devices. In addition, one or more of the legacy peripherals 25, 26 may be disconnected from the legacy platform 20 and connected to the new platform 30 when the new platform 30 is connected to the computer network of the business.

D. Middleware.

Figure 2:
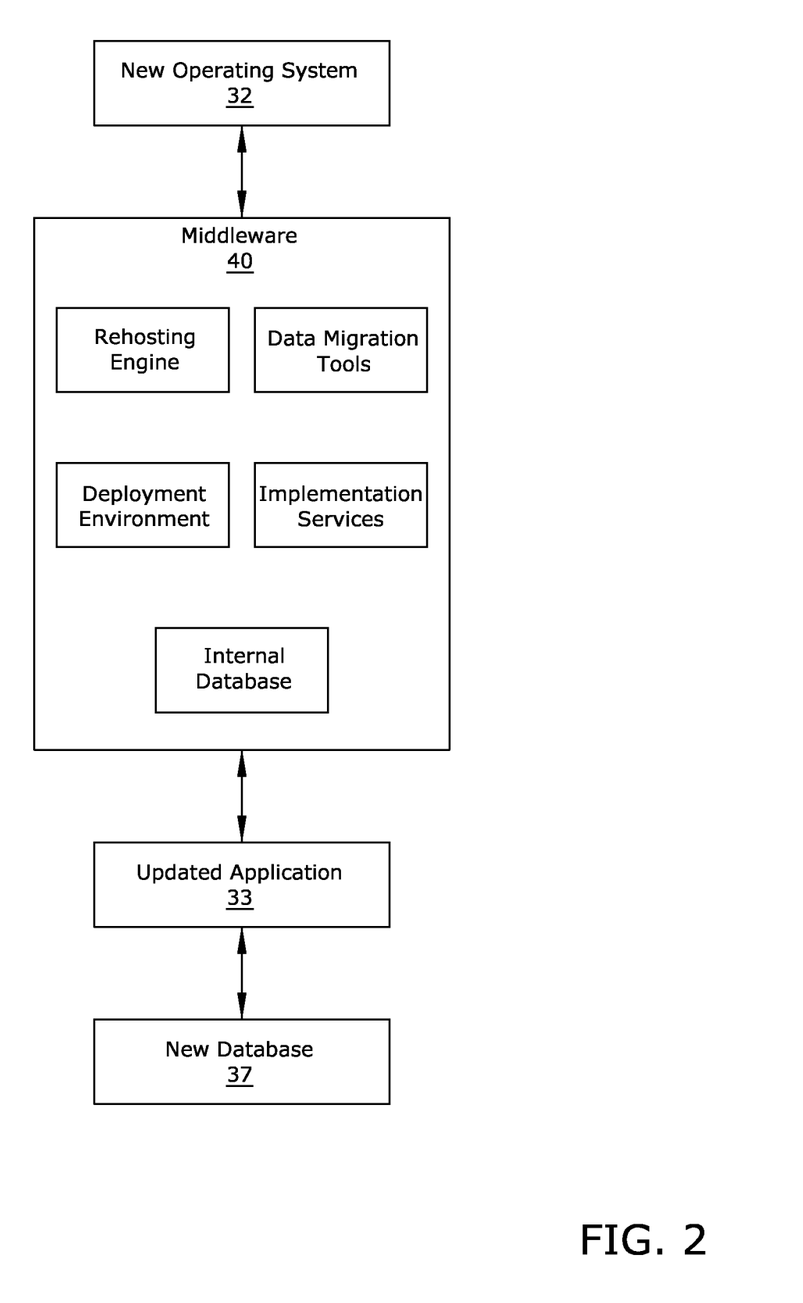
FIG. 2 is a block diagram illustrating the communications between the middleware and the updated application.
Figure 3:
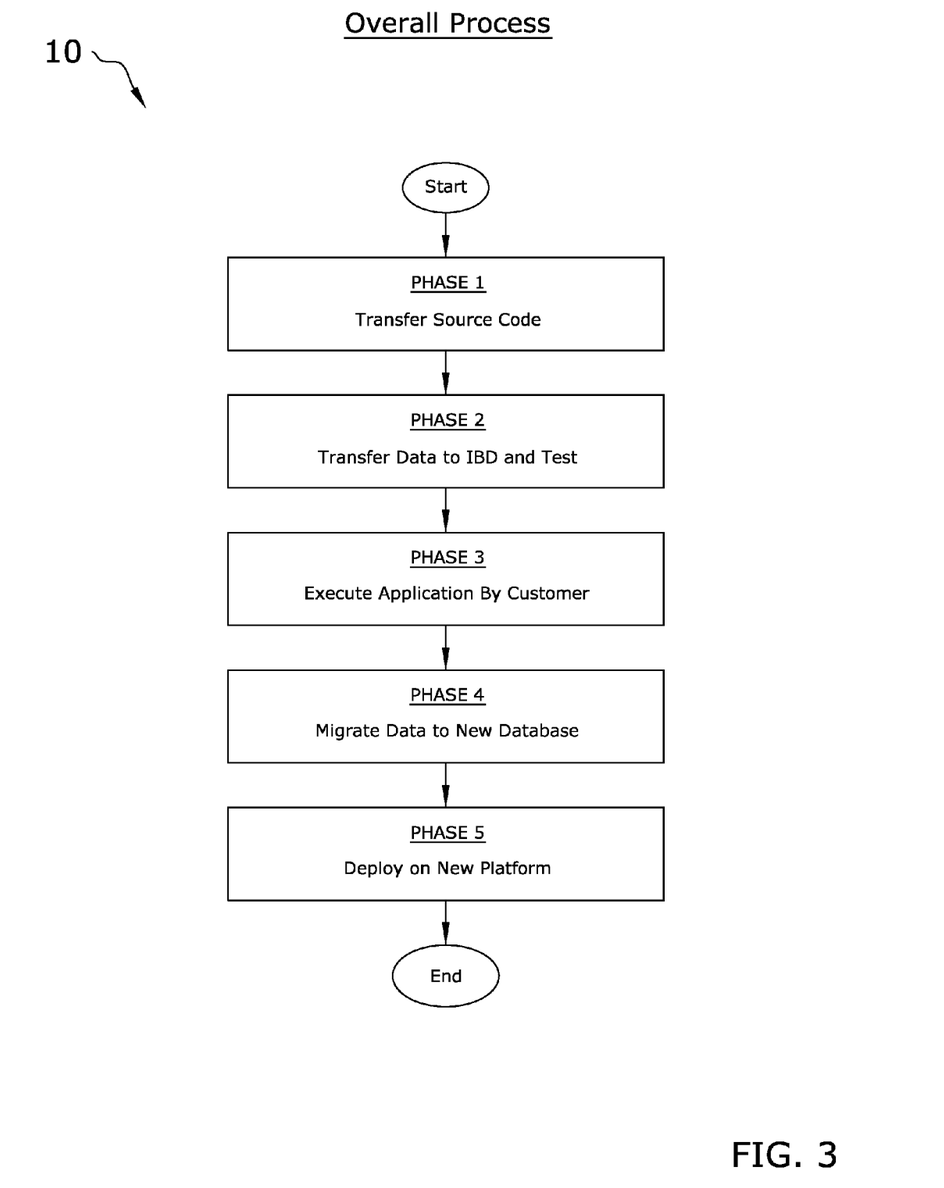
FIG. 3 is a flowchart illustrating the overall process for the present invention.
Figure 4:
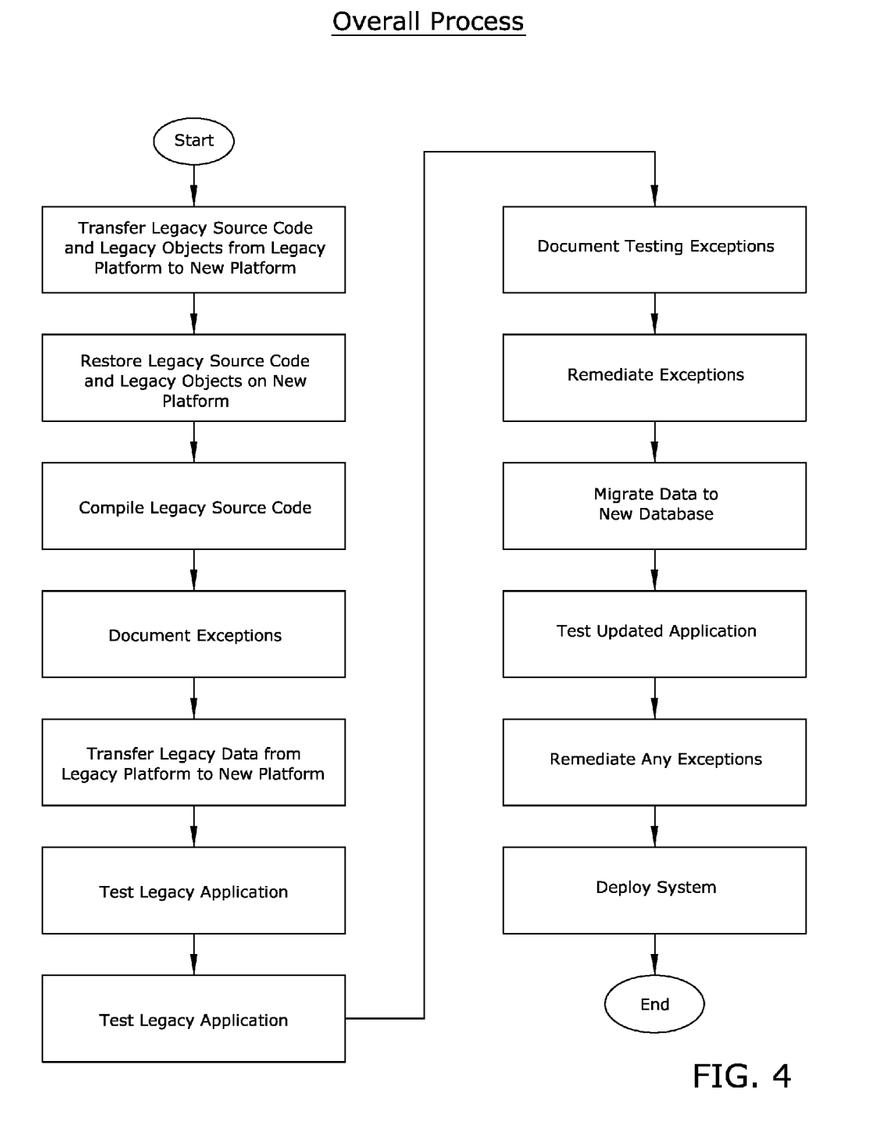
FIG. 4 is a flowchart illustrating the overall process for the present invention.

The middleware 40 is installed on the new operating system 32 of the new platform 30. The middleware 40 includes software products (e.g. rehosting engine, data migration tools, a deployment environment and implementation services), internal database and proprietary services developed to recreate the legacy operating system 22 of the legacy platform 20.

The rehosting engine of the middleware 40 incorporates one or more compilers such as but not limited to RPG compiler, a COBOL compiler, a CL compiler and a DDS compiler. The source objects of the legacy application 23 are recompiled using the middleware 40 and are then deployed by the middleware 40 using the deployment environment that operates under the new operating system 32 of the new system. The data migrations toolset maps the data in the DB2/400 database which operates at the machine level on the IBM® AS/400® into an internal database (IDB) that is incorporated within the middleware 40 that mimics the DB2/400 and operates in the software stack. The deployment environment of the middleware 40 replicates the operating environment of the legacy platform 20 including the utilities, commands and the database necessary to execute and deploy the legacy applications 23.

The middleware 40 executes and operates on the new operating system 32 of the new platform 30. The middleware 40 preferably operates on most modern operating systems and central processing units. The middleware 40 replicates the original operating environment for the legacy application 23 so that the updated application 33 can operate on the new platform 30 as it would on the legacy platform 20. The middleware 40 provides a software layer between the new operating system 32 and the updated applications 33.

The middleware 40 can also be embodied as computer readable code on a computer readable medium. The computer readable medium is any data storage device that can store data which can thereafter be read by a computer system. Examples of the computer readable medium include but are not limited to read-only memory, random-access memory, magnetic data storage devices such as diskettes, USB flash drives, and optical data storage devices such as CD-ROMs. The computer readable medium can also be distributed over a network coupled computer systems so that the computer readable code is stored and executed in a distributed fashion.

The middleware 40 may be embodied within various languages and technologies such as but not limited to JAVA, JAVASCRIPT, JSCRIPT, WMLSCRIPT, ACTIVEX, CGI, scripts, plug-ins, BASIC, VISUAL BASIC, C, C++, COBOL, FORTRAN, ADA, HTML, DHTML, XML, SGML, WML, HDML, FLASH, SHOCKWAVE, GIF, JPEG, ADOBE ACROBAT, PDF, MICROSOFT WORD, and PASCAL. The middleware 40 may be operated upon various operating systems such as but not limited to UNIX®, LINUX® or WINDOWS®.

E. Updated Application.

The updated application 33 is a slightly modified version of the legacy application 23 wherein updates have been made to the legacy application 23 to accommodate differences between the legacy platform 20 and the new platform 30. For example, on the legacy platform 20, the legacy application 23 could call out a printer by a Printer ID, whereas on the new platform 30 the printer may be called out by an IP address or other identifier different from the legacy application 23 which requires updating of the legacy source code to form the updated application 33. The updated application 33 is the result of multiple tests of the legacy application 23 and the intermediate application on the new platform 30 until no further changes are required.

F. New Database.

If the customer desires for the data to be stored upon a new database 37 instead of the internal database associated with the legacy operating system 22 and legacy application 23, a new database 37 may be installed on the new platform 30 for storing the data. The new database 37 may be comprised various databases such as but not limited to an ORACLE® database (a.k.a. Oracle RDBMS; an object-relational database management system—ORDMS developed by Oracle Corporation) or MICROSOFT® SQL SERVER® (a relational database management system developed by Microsoft Corporation). The new database 37 preferably operates directly upon the new operating system 32 and is customizable to communicate with the updated application 33 for storing the data transferred from the legacy data 24 on the legacy platform 20.

G. Updated Data

The updated data 34 is the legacy data 24 stored within the new database 37 in an updated manner. In the legacy platform 20, the legacy data 24 is stored within an internal database. However, the new database 37 may utilize a table or view to store the data. To transfer the data from the internal database of the legacy application 23, the middleware 40 reads the definition of each physical file and logical file for the internal database and then creates a corresponding table or view within the new database 37.

H. Operation of Preferred Embodiment.

1. Phase 1—Transfer Source Code from Legacy Platform to New Platform.

Figure 5:
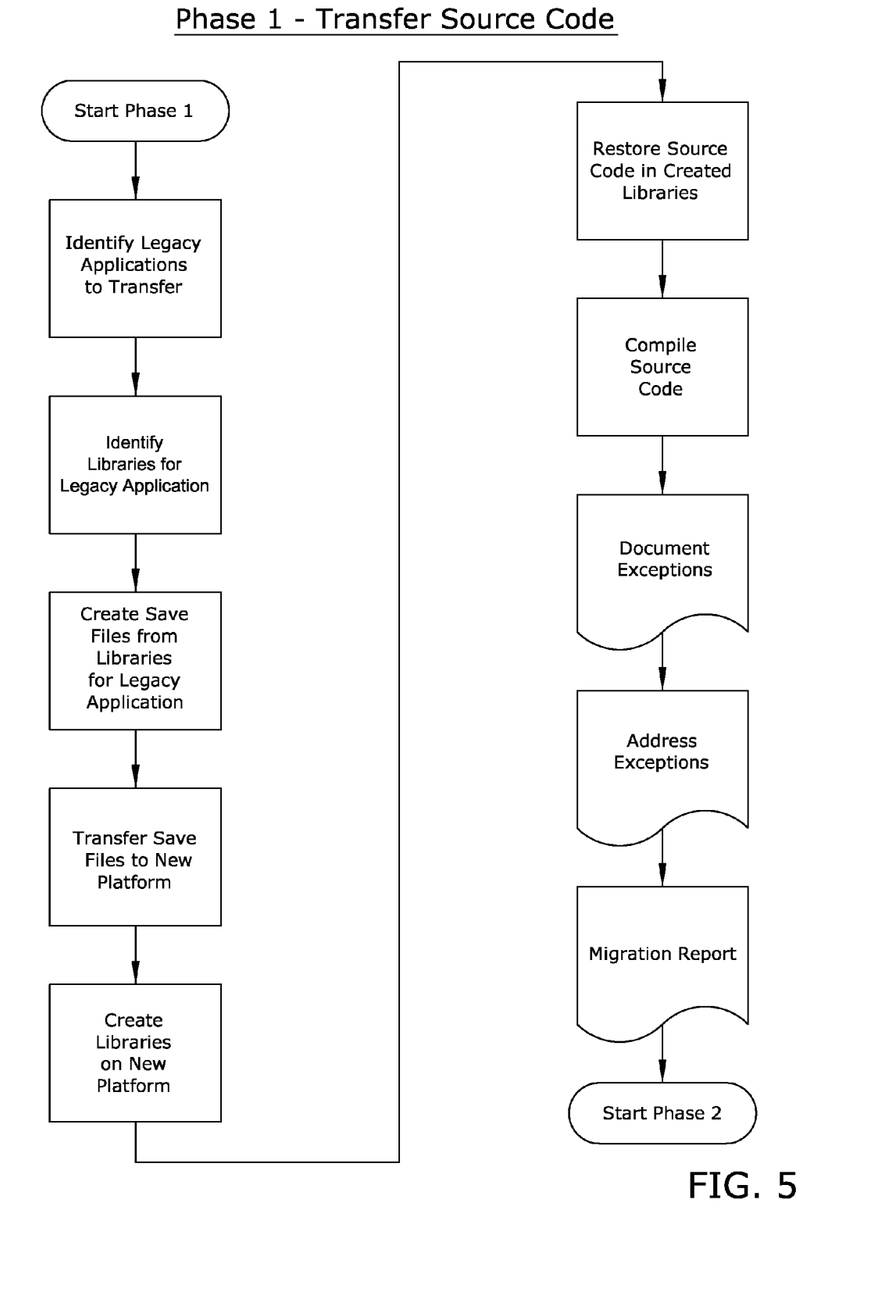
FIG. 5 is a flowchart illustrating Phase 1 of the present invention involving the transfer of source code from the legacy platform to the new platform.

FIG. 5 best illustrates Phase 1 of the present invention. Initially, one or more legacy applications 23 are identified on the legacy platform 20 that are to be transferred to the new platform 30. Once each legacy application 23 is identified, the libraries that comprise the legacy application 23 are then identified. The libraries contain the legacy code and additional objects (created without source code) for the legacy application 23. The additional objects include data areas, output queues, job descriptions, query definitions, message files, user spaces and the like.

After the libraries are identified, a series of save files (*SAVF) are created on the legacy platform 20 wherein each save file contains one library for the legacy application 23. On the AS/400®, each library for the legacy application 23 can be saved to a corresponding save file using the save library (SAVLIB) command. The following are some IBM® standard libraries for the AS/400® computing platform: QSYS (System Parent Library), QSYS2 (System Library for CPI's), QHLPSYS (Online Documentation Library for Users), QTCP (TCP Connectivity Utilities), QAFP (Advanced Function Printing), and QGPL (General Purpose Library).

The save files for the legacy application 23 on the legacy platform 20 are then transferred to the new platform 30. The save files may be transferred to the new platform 30 via various protocols and transfer mediums. It is preferable that the save files on the legacy application 23 be transferred via file transfer protocol (FTP) in binary mode.

The transfer medium to transfer the save files from the legacy platform 20 to the new platform 30 may be comprised of a wired communication system or a wireless communication system. For example, the wired communication system could be comprised of a direct wired connection or a computer network (e.g. global computer network such as the Internet or a local area network).

After the save files for the legacy application 23 are transferred to the new platform 30, the middleware 40 installed on the new platform 30 restores the libraries, legacy code and additional objects onto the new platform 30. In particular, the middleware 40 creates the libraries on the new platform 30 with the same name as they existed on the legacy platform 20. The middleware 40 then restores the legacy code and additional objects within their corresponding libraries on the new platform 30. The middleware 40 executes and operates on the new operating system 32 of the new platform 30.

Once legacy code and additional objects are transferred to the new platform 30, one or more of the compilers in the middleware 40 then compiles the legacy code to create an intermediate application on the new platform 30 that can be run within the middleware 40. It is important that the middleware 40 does not translate the RPG or COBOL into a different programming language. The compilers in the middleware 40 compile the original source code into the native executable object code for the new platform 30. The compiler within the middleware 40 preferably compiles all sources in following order: physical files, logical files, display files, printer files, CL, RPG, COBOL, ILERPG, SQLRPG, SQLCOBOL, commands and panel groups.

During the compilation process, all exceptions are documented so the exceptions can be addressed. Examples of exceptions include programming languages not supported, program calls to peripherals that are no longer in the environment, missing components and unsupported commands, operation codes and keywords. The documented exceptions are addressed differently depending on their nature. For example, for missing components exceptions, the installer will request the customer to provide the components so they can be incorporated into the transferred files and then the compilation process is repeated. As another example, for unsupported commands, operations codes and keywords exceptions, the installer will provide workarounds and implement those workarounds with the potential for customer participation in the implementation of the workaround.

After the exceptions have been addressed, a migration report is created indicating the work done in Phase 1 including remediation steps and statistics. The migration report is then provided to the customer for their records.

2. Phase 2—Transfer Data to IDB and Test.

Figure 6:
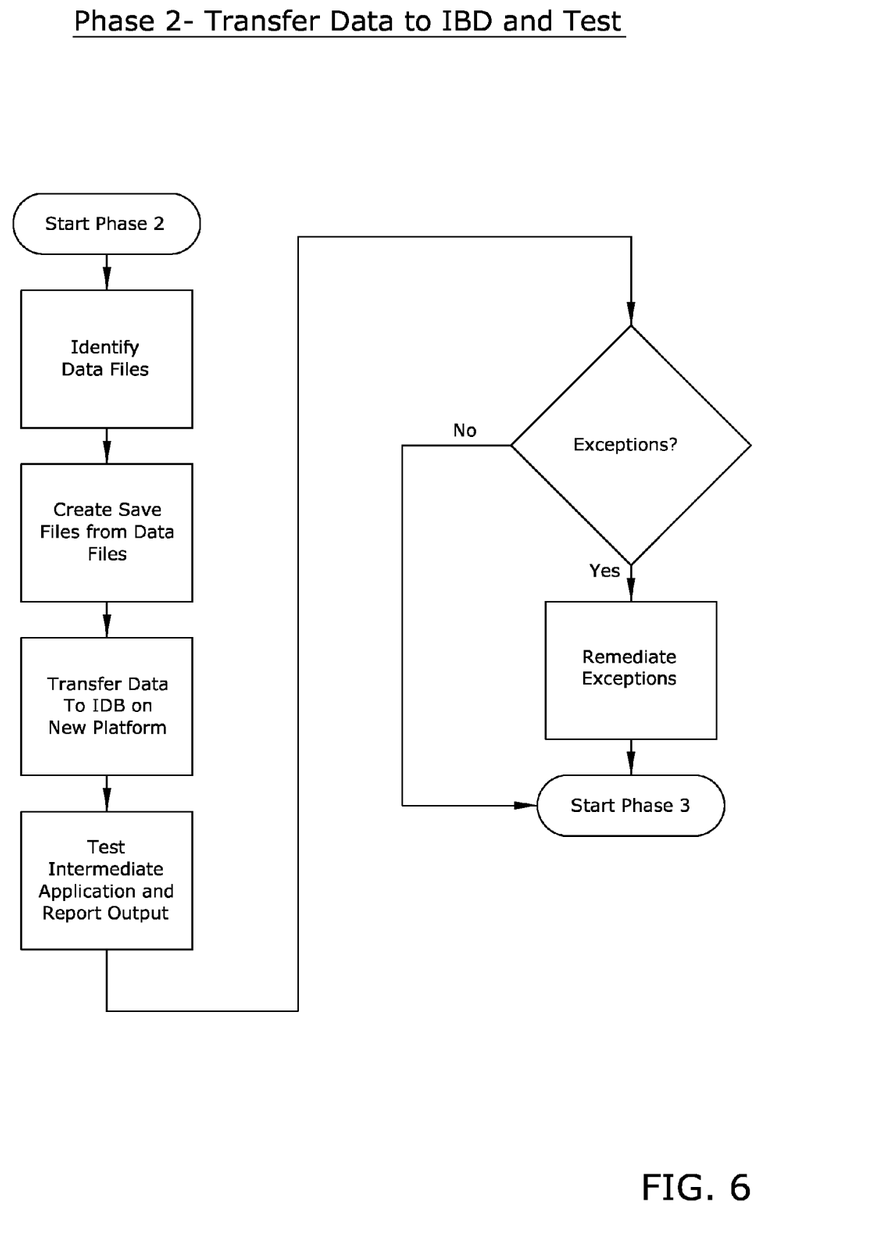
FIG. 6 is a flowchart illustrating Phase 2 of the present invention involving the transfer of data from the legacy platform to the internal database on the new platform.

FIG. 6 of the drawings illustrates the overall process for transferring data files to the internal database (IDB) within the middleware 40. The internal database is a replicated database hosted by the middleware 40 that replicates the database on the legacy platform 20. The data files may remain in the internal database or converted to a new database 37 as discussed herein.

The data files (physical files and logical files) on the legacy platform 20 are saved in save files (*SAVF) on the legacy platform 20. The save files comprising the data files are then transferred to the new platform 30 where the middleware 40 migrates the save files into the physical files and the logical files created during the compilation of the legacy code. It is preferable to transfer the save files via FTP in binary mode similar to the initial transfer of save files.

Based upon application execution instructions provided by the customer, the installer performs exhaustive testing of the intermediate application on the new platform 30 utilizing the transferred data. The testing preferably includes interactive operations and batch operations including execution of any routines that interface with other systems. The testing party will compare and validate output from the legacy platform 20 and the new platform 30 to ensure that the output is the same.

Based upon the results of the testing, the installer fixes any problems identified. For example, the installer may fix files, fix programs, find workarounds to address unexpected behaviors and the like. After updating the application to form the updated application 33, the installer performs final testing until the tests are satisfactory as illustrated in FIG. 6 of the drawings.

3. Phase 3—Execute Application by Customer.

Figure 7:
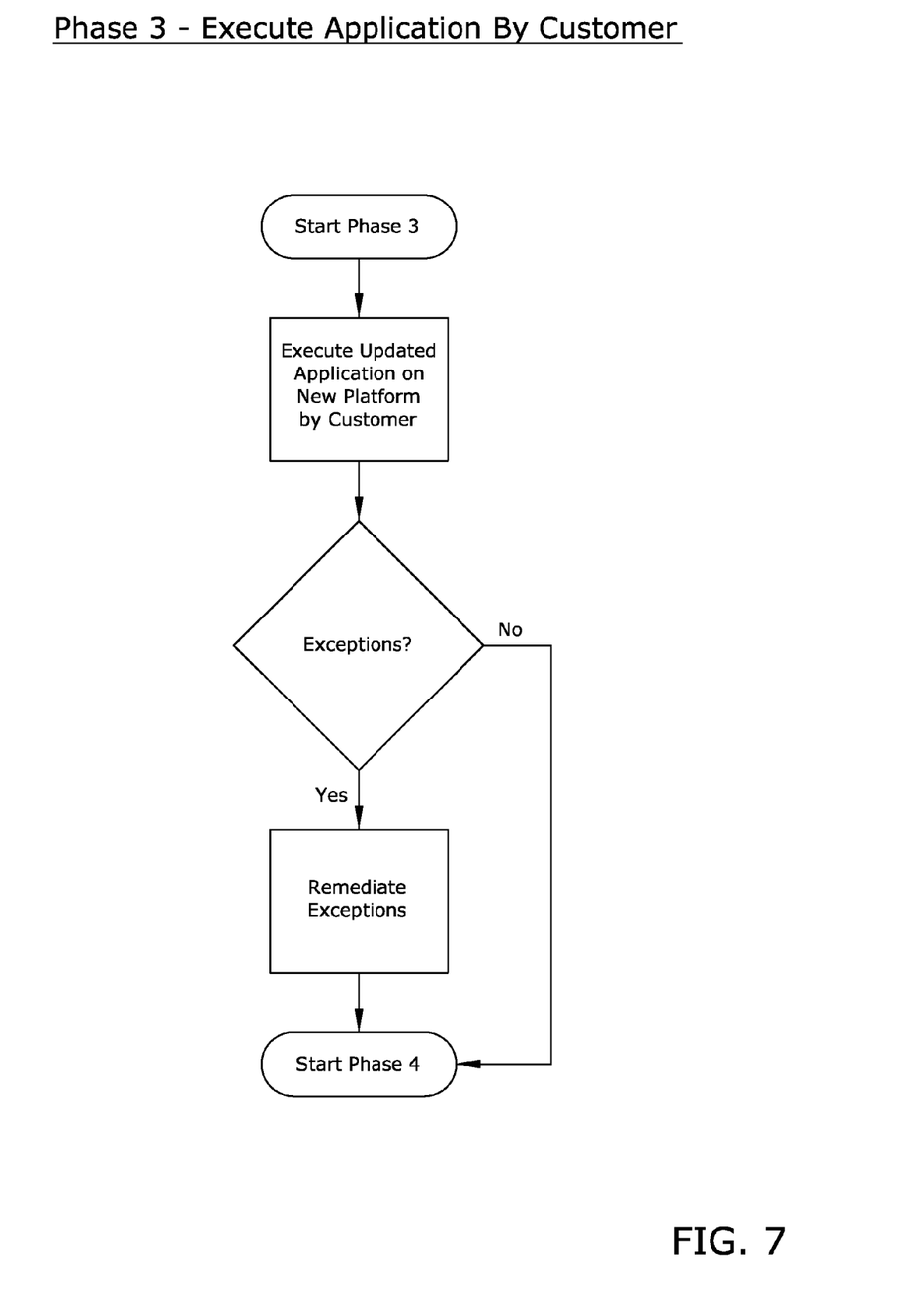
FIG. 7 is a flowchart illustrating Phase 3 of the present invention involving the execution of the updated application on the new platform and remediating exceptions.

FIG. 7 illustrates the overall process of execution of the updated application 33 by the customer. The updated application 33 is deployed on the new platform 30 where the customer performs the same application execution scripts in order to test the updated application 33. The installers supervise the execution and testing of the updated application 33 to receive feedback from testing and to also analyze, discuss and resolve any outstanding issues. Based upon the results of the testing, the installer fixes any problems identified. For example, the installer may fix files, fix programs, find workarounds to address unexpected behaviors and the like. After making any final changes, the installer performs final testing until the tests are satisfactory as illustrated in FIG. 6 of the drawings.

4. Phase 4—Migrate Data to New Database.

Figure 8:
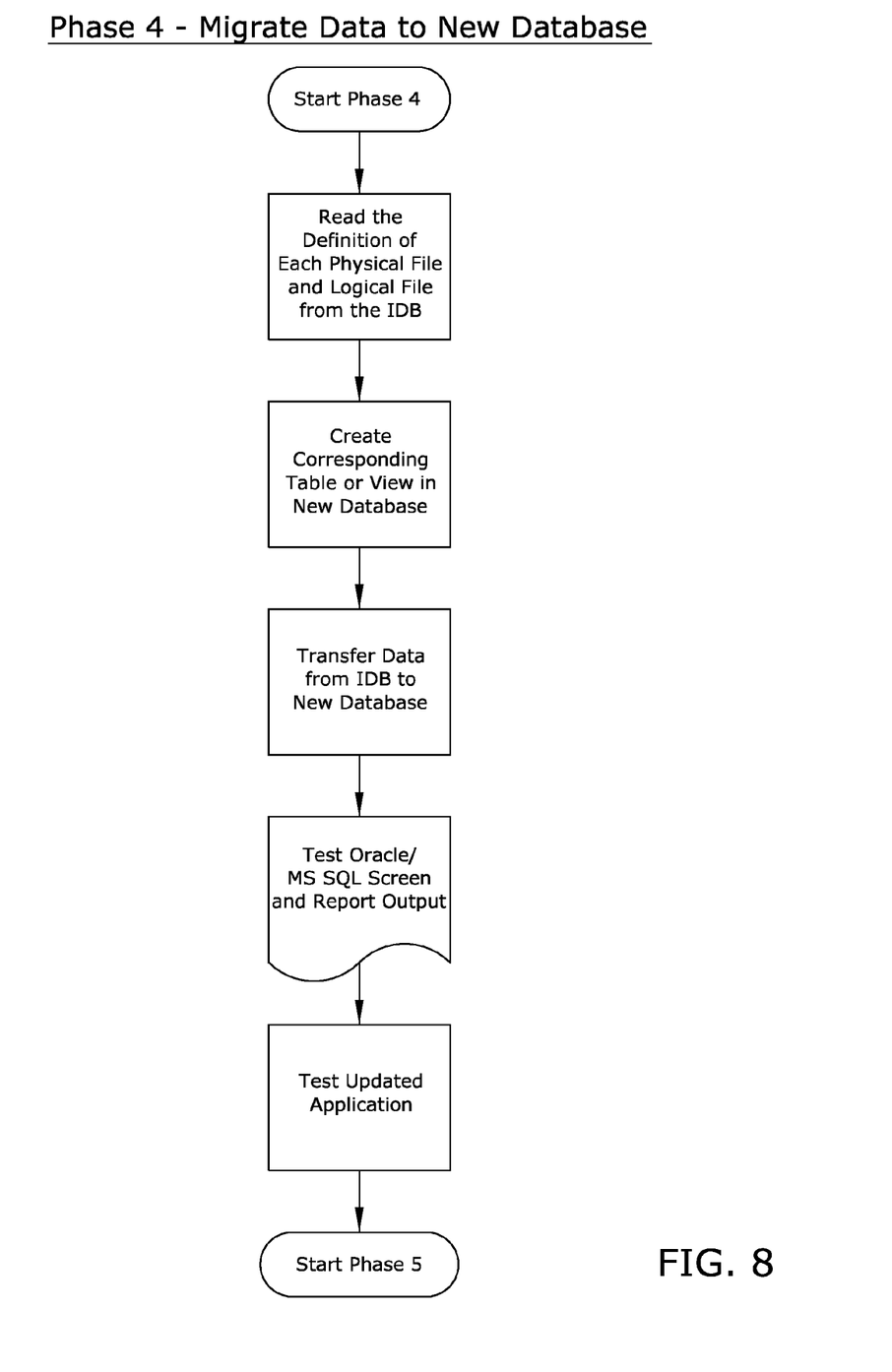
FIG. 8 is a flowchart illustrating Phase 4 of the present invention involving the migration of data from the internal database to the new database on the new platform.

FIG. 8 illustrates the overall process of transferring data from the internal database to a new database 37 external of the middleware 40. As can be appreciated, the new database 37 is not required to utilize the updated application 33 and the updated application 33 can be utilized with only the internal database. However, if the customer desires to utilize a database different from the internal database within the middleware 40, the data within the internal database must be transferred to the new database 37.

To transfer the data from the internal database, the middleware 40 reads the definition of each physical file and logical file for the internal database and then creates a corresponding table or view within the new database 37. The middleware 40 then transfers the data from the internal database to the new database 37 correspondingly. After the conversion to the new database 37, the installer performs additional tests to ensure that the updated application 33 is generating the proper screen and report contents. Once the new database 37 is confirmed, the entire updated application 33 is retested using the data from the new database 37. Remediation of any exceptions is made on a case-by-case basis.

5. Phase 5—Deployment on New Platform.

Figure 9:
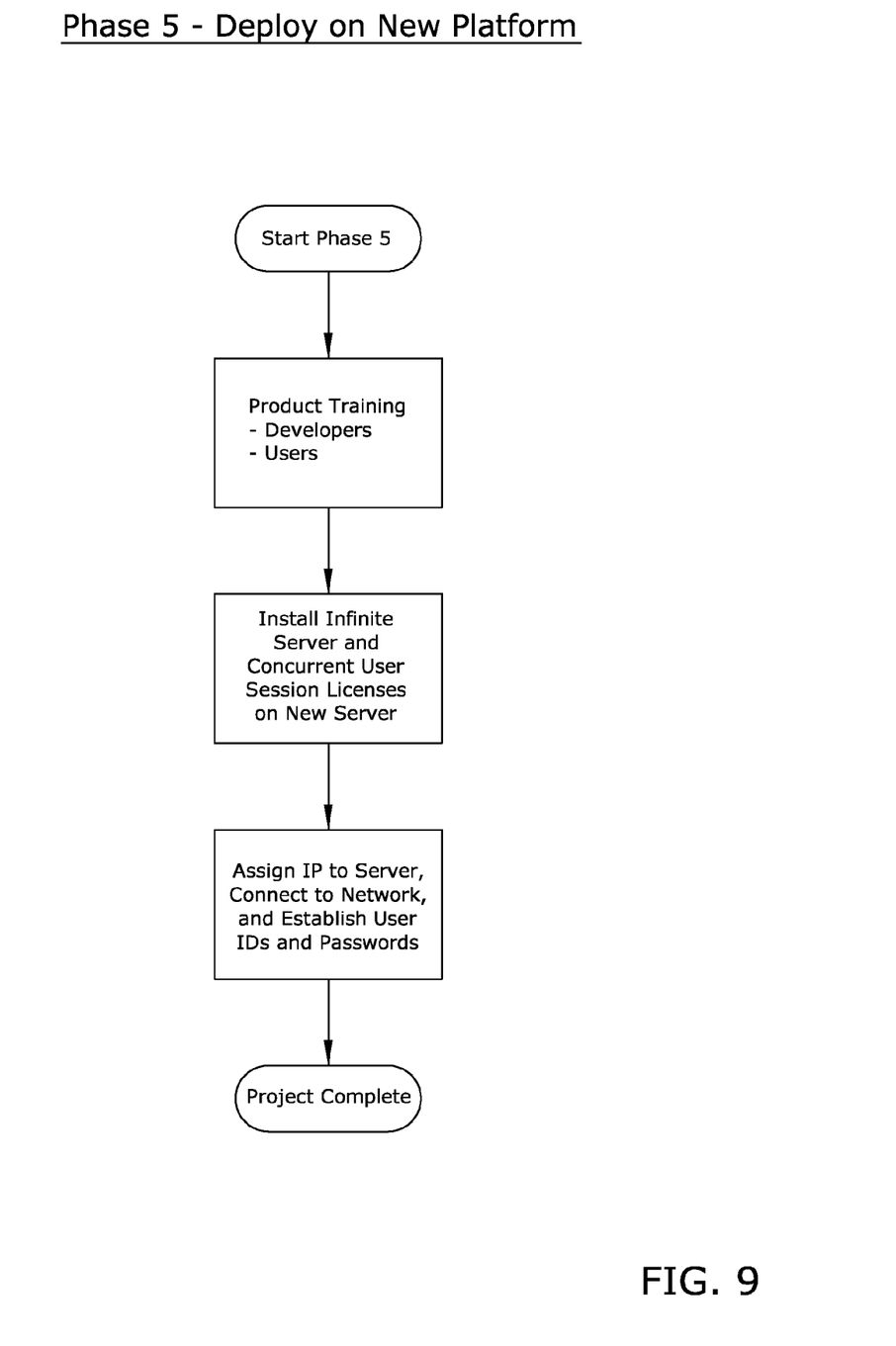
FIG. 9 is a flowchart illustrating Phase 5 of the present invention involving deployment of the system.

FIG. 9 illustrates the final phase involving deployment of the updated application 33 and new database 37 on the new platform 30. Training is provided to the individuals designated by the customer. The installer works in conjunction with the customer's system administrator responsible for the new platform 30. The installer configures the new operating system 32 and database parameters. Once the testing is finalized, the new platform 30 is established on the computer network of the customer. In addition, workers are provided with their credentials and redirected to the new platform 30 to interface with the updated application 33. Because the updated application 33 operates basically the same as the legacy application 23, there is little training required of the workers.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above.

All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Many modifications and other embodiments of the invention will come to mind to one skilled in the art to which this invention pertains and having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of rehosting a legacy application, comprising:
providing a new platform comprised of new hardware, a new operating system, and middleware;
transferring a legacy source code for a legacy application from a legacy platform to said new platform;
creating a plurality of library save files on said legacy platform, wherein each of said library save files contains a library for said legacy application, wherein said legacy source code includes Control Language code, Report Program Generator code, COBOL code, Remote Program Generator Integrated Language Environment code, SQLRPG code, SQLCOBOL code, command libraries and panel groups;
transferring said plurality of library save files from said legacy platform to said new platform;
creating a plurality of data save files on said legacy platform, wherein said plurality of data save files comprise legacy physical files and legacy logical files;
transferring said data save files from said legacy platform to said new platform;
compiling said legacy source code with said middleware to restore said legacy application on said new platform, said compiling step comprising the steps of first compiling said Control Language code, then compiling said Report Program Generator code, then compiling said COBOL code, then compiling said Remote Program Generator Integrated Language Environment code, then compiling said SQLRPG code, then compiling said SQLCOBOL code, then compiling said command libraries and then compiling said panel groups;
wherein said compiling step includes identifying missing components, issuing a request for said missing components, and incorporating said missing components into one or more of said data save files;
executing said legacy application on said new platform with said middleware, wherein said middleware operates between said new operating system and said legacy application;
comparing a new output of said legacy application on said new platform with a legacy output of said legacy application on said legacy platform; and
validating that said new output matches said legacy output.

2. The method of claim 1, wherein said save files and said data save files are stored within an internal database on said new platform.

3. The method of claim 2, wherein said internal database is within said middleware.

4. The method of claim 3, wherein said internal database replicates a legacy database on said legacy platform.

5. The method of claim 4, wherein said legacy database is comprised of a DB2/400 database.

6. The method of claim 1, including transferring said save files and said data save files to a new database.

7. The method of claim 6, wherein said new database is external of said middleware.

8. The method of claim 6, wherein said new database is comprised of a relational database management system or an object-relational database management system.

9. The method of claim 1, including identifying exceptions within said legacy application and remediating said exceptions by updating said legacy source code.

10. A method of rehosting a legacy application, comprising:
providing a legacy platform comprised of legacy hardware, a legacy operating system, a legacy application that operates on said legacy operating system and a legacy data, said legacy data comprising legacy physical files and legacy logical files;
providing a new platform comprised of new hardware, a new operating system, and middleware;
identifying a plurality of libraries for a legacy source code for said legacy application, wherein said legacy source code comprises physical files, logical files, display files, printer files, Control Language code, RPG Report Program Generator code, COBOL code, Remote Program Generator Integrated Language Environment code, SQLRPG code, SQLCOBOL code, command libraries and panel groups;
saving said plurality of legacy libraries in a plurality of library save files, wherein said plurality of library save files each correspond to one of said plurality of legacy libraries;
transferring said plurality of library save files from said legacy platform to said new platform;
transferring said legacy data for said legacy application from said legacy platform to said new platform;
creating a plurality of new libraries on said new platform that correspond to said plurality of legacy libraries;
restoring said legacy source code within said plurality of new libraries;

compiling said legacy source code with said middleware to restore said legacy application on said new platform, wherein said compiling step includes identifying unsupported commands and implementing workarounds for said unsupported commands, wherein said compiling step further includes identifying missing components, issuing a request for said missing components, and incorporating said missing components into one or more of said data save files, said compiling step comprising the steps of first compiling said Control Language code, then compiling said Report Program Generator code, then compiling said COBOL code, then compiling said Remote Program Generator Integrated Language Environment code, then compiling said SQLRPG code, then compiling said SQLCOBOL code, then compiling said command libraries and then compiling said panel groups;

executing said legacy application on said new platform with said middleware, wherein said middleware operates between said new operating system and said legacy application;

comparing a new output of said legacy application on said new platform with a legacy output of said legacy application on said legacy platform; and validating that said new output matches said legacy output.

11. The method of claim 10, wherein said legacy data is stored within an internal database on said new platform.

12. The method of claim 11, wherein said internal database is within said middleware.

13. The method of claim 12, wherein said internal database replicates a legacy database on said legacy platform.

14. The method of claim 13, wherein said legacy database is comprised of a DB2/400 database.

15. The method of claim 10, including transferring said legacy data to a new database.

16. The method of claim 15, wherein said new database is external of said middleware.

17. The method of claim 10, including identifying exceptions within said legacy application and remediating said exceptions by updating said legacy source code.

18. The method of claim 17, including compiling said updated legacy source code with said middleware to create an updated application that operates on said middleware.

19. The method of claim 10, said compiling step further comprising the steps of first compiling said physical files, then compiling said logical files, then compiling said display files, and then compiling said printer files.

* * * * *